US011677292B2

(12) United States Patent
Ziskovsky

(10) Patent No.: US 11,677,292 B2
(45) Date of Patent: Jun. 13, 2023

(54) ELECTRIC MOTOR COOLING JACKET

(71) Applicant: Dana Heavy Vehicle Systems Group, LLC, Maumee, OH (US)

(72) Inventor: Darren J. Ziskovsky, Bowling Green, OH (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 247 days.

(21) Appl. No.: 17/029,677

(22) Filed: Sep. 23, 2020

(65) Prior Publication Data

US 2022/0094238 A1 Mar. 24, 2022

(51) Int. Cl.
| | |
|---|---|
| *H02K 5/20* | (2006.01) |
| *H02K 3/50* | (2006.01) |
| *H02K 5/22* | (2006.01) |
| *H02K 7/00* | (2006.01) |
| *H02K 9/19* | (2006.01) |
| *H02K 11/33* | (2016.01) |
| *B60K 6/24* | (2007.10) |
| *B60K 6/36* | (2007.10) |
| *B60K 6/26* | (2007.10) |

(52) U.S. Cl.
CPC ............... *H02K 5/203* (2021.01); *H02K 3/50* (2013.01); *H02K 5/20* (2013.01); *H02K 5/225* (2013.01); *H02K 7/006* (2013.01); *H02K 9/19* (2013.01); *H02K 11/33* (2016.01); *B60K 6/24* (2013.01); *B60K 6/26* (2013.01); *B60K 6/36* (2013.01); *B60Y 2200/92* (2013.01); *B60Y 2400/11* (2013.01); *B60Y 2400/20* (2013.01); *B60Y 2400/60* (2013.01); *H02K 2203/09* (2013.01)

(58) Field of Classification Search
USPC ........ 310/71, 52, 53, 54, 55, 56, 57, 58, 59, 310/60 R, 61, 62, 63, 60 A
See application file for complete search history.

(56) References Cited

U.S. PATENT DOCUMENTS

| | | | |
|---|---|---|---|
| 4,712,029 A * | 12/1987 | Nold | H02K 5/225 310/71 |
| 5,491,370 A * | 2/1996 | Schneider | H02K 11/33 310/68 R |
| 6,300,693 B1 | 10/2001 | Poag et al. | |
| 6,554,230 B1 | 4/2003 | Horski | |
| 7,675,209 B2 | 3/2010 | Masoudipour et al. | |
| 8,029,252 B2 | 10/2011 | Noelle | |
| 9,692,277 B2 | 6/2017 | Pearce, Jr. et al. | |
| 9,790,662 B2 | 10/2017 | Ota et al. | |
| 9,912,207 B2 | 3/2018 | Smith et al. | |
| 9,948,158 B2 | 4/2018 | Lin et al. | |
| 10,178,780 B2 | 1/2019 | Nakatsu et al. | |
| 10,454,350 B2 | 10/2019 | Inokuchi | |

(Continued)

FOREIGN PATENT DOCUMENTS

| | | |
|---|---|---|
| EP | 3193004 A1 | 7/2017 |
| JP | 2002120570 A | 4/2002 |

*Primary Examiner* — Alexander A Singh
(74) *Attorney, Agent, or Firm* — McCoy Russell LLP

(57) ABSTRACT

Systems are provided for an electric motor housing. In one example, a system comprising a phase connection enclosure comprising a bus bar assembly sealed between a motor lead and a plurality of phase cable connections. The phase connection enclosure is integrally arranged within a cooling jacket of the electric motor housing.

20 Claims, 7 Drawing Sheets

(56) References Cited

U.S. PATENT DOCUMENTS

| | | | |
|---|---|---|---|
| 2004/0206558 A1* | 10/2004 | Kabasawa | B60L 3/0061 |
| | | | 903/952 |
| 2009/0251018 A1* | 10/2009 | Koshida | B60K 6/445 |
| | | | 310/71 |
| 2010/0139896 A1* | 6/2010 | Chamberlin | H02K 9/19 |
| | | | 439/190 |
| 2010/0253164 A1* | 10/2010 | Chamberlin | H02K 5/225 |
| | | | 310/71 |
| 2014/0339937 A1* | 11/2014 | Tokunaga | H02K 5/10 |
| | | | 310/71 |
| 2017/0346370 A1 | 11/2017 | Sentis et al. | |
| 2018/0026493 A1* | 1/2018 | Jung | H02K 5/20 |
| | | | 310/52 |
| 2018/0102686 A1* | 4/2018 | Bouarroudj | H02K 9/197 |
| 2020/0195094 A1* | 6/2020 | Geither | H02K 5/203 |

* cited by examiner

ELECTRIC MOTOR COOLING JACKET

TECHNICAL FIELD

The present description relates generally to an electric motor cooling jacket with an integrated phase connection terminal box.

BACKGROUND AND SUMMARY

Concern over climate change is leading manufacturers to switch energy sources from fossil fuels to other energy sources, such as electrical energy. This includes a variety categories including vehicles, trucks, boats, motorcycles, airplanes, trains, and other transportation devices.

There are performance demands for electrified transportation vehicles to increase power output and drive range. Increases in power and mileage output also result in increased heat generation and a demand to cool electric motors and other electric devices. In configuring increased cooling demands, noise, vibration, and harshness may be increased along with packaging constraints, which restrict a number of applications in which the cooling system may be used. As such, examples of previous cooling systems may need modifications to fit a variety of applications, which may be expensive and time consuming.

Other examples of addressing electric motor cooling include a controller assembly partially surrounded by a cooling channel. One example approach is shown by Smith et al. in U.S. Pat. No. 9,912,207. Therein, Smith teaches a controller assembly of an electric machine partially enclosed by a cooling channel of a cover of the electrical machine. The cover comprises recesses through which the electrical connections of the controller assembly may extend. One of the recesses is arranged adjacent to an air outlet of the cooling channel.

However, the inventor has identified some issues with the approaches described above. For example, a radial space of the electric motor and its phase connections may increase a packaging space of the electrical machine. Furthermore, the air cooling flow shown by Smith needs additional machining and manufacturing techniques to introduce air flow to an electric machine cooled by a liquid, such as oil. Thus, the design of Smith may not capitalize and/or enhance some pre-existing features present on on-road vehicles.

In one example, the issues described above may be addressed by a system comprising a cooling jacket for an electric motor. The cooling jacket surrounds a bus bar assembly sealed between a motor lead and a plurality of cable connections. In this way, the bus bar may be integrally formed in the cooling jacket to decrease manufacturing constraints and reduce manufacturing costs.

As one example, a low profile connection for the electric motor configured to seal a bus bar between the motor lead and the phase cable connections to mitigate oil wicking through the cables and/or connections is provided. A radial space needed for the electric motor phase cable connections may be reduced. The phase connection box is integrated into a cooling jacket casting/machining, which may eliminate a desire for a separate phase connection box assembly while also integrating the terminal block into the cooling jacket housing.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
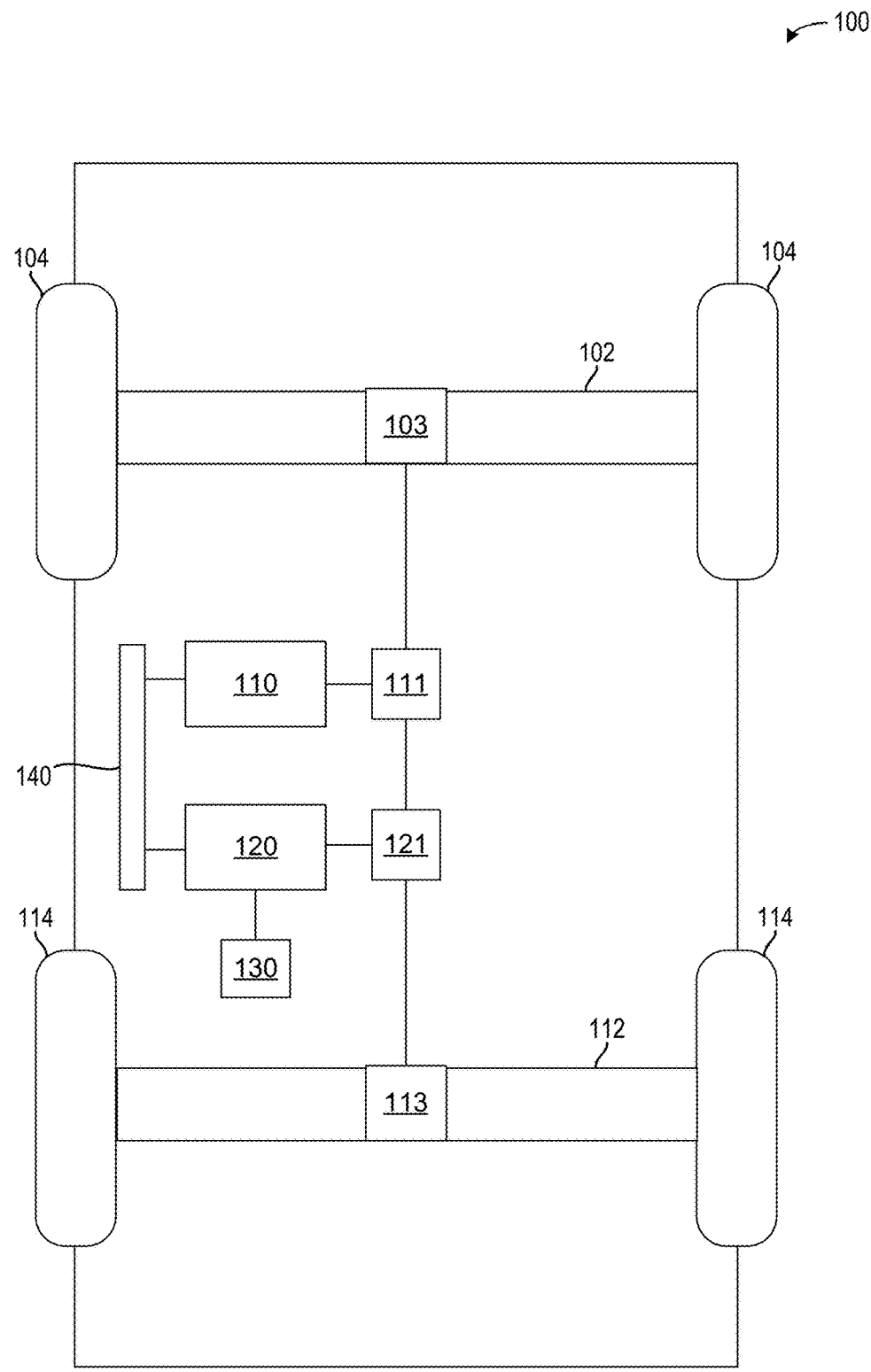
FIG. 1 shows a hybrid vehicle architecture.
Figure 2:
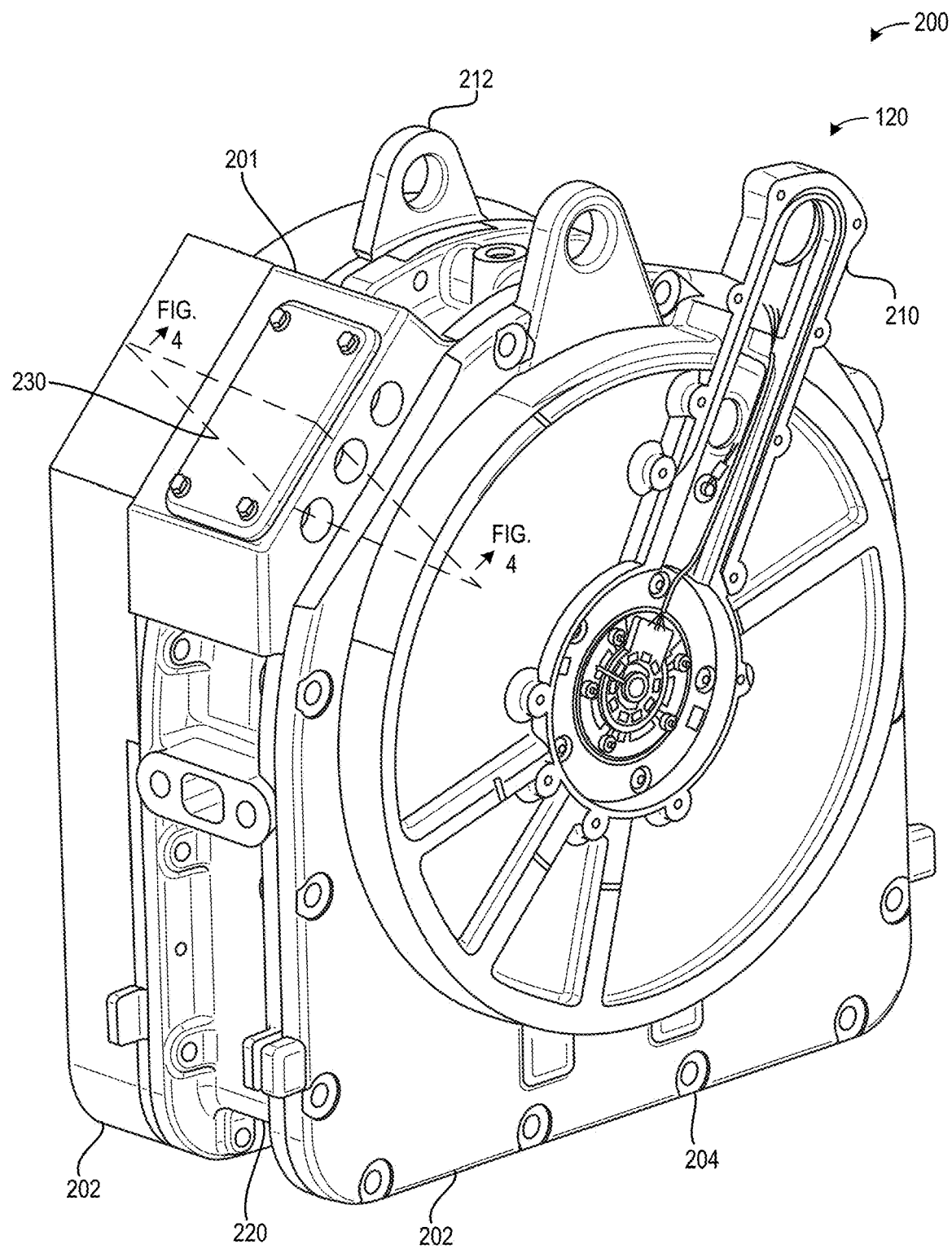
FIG. 2 shows an isometric view of an electric motor cooling jacket with an integrated phase connection box.
Figure 3:
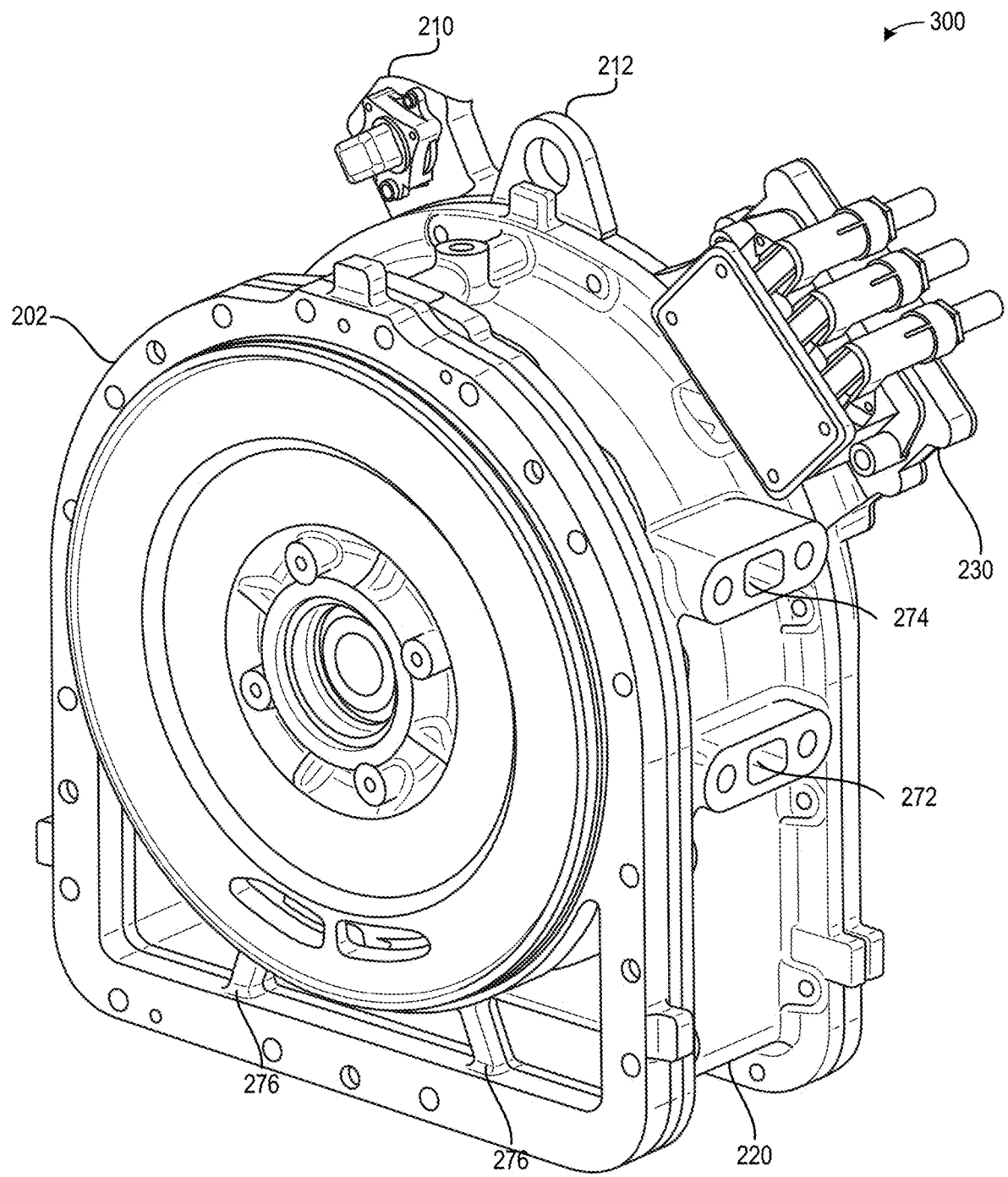
FIG. 3 shows a bolt connection box of the electric motor cooling jacket.
Figure 3:
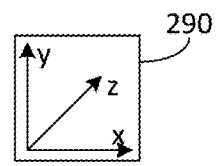
Figure 4:
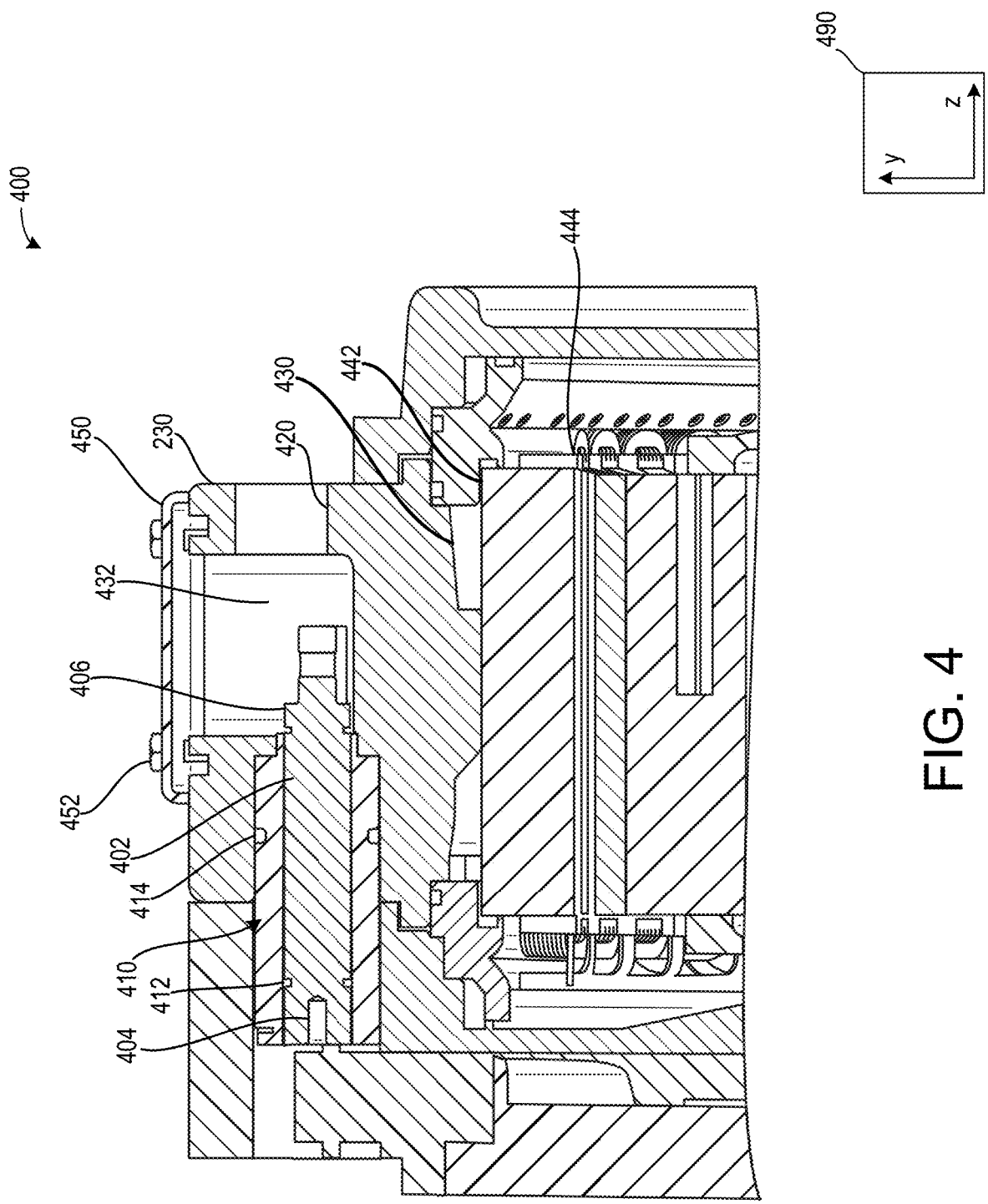
FIG. 4 shows an integrated connection box of the electric motor cooling jacket.
Figure 5:
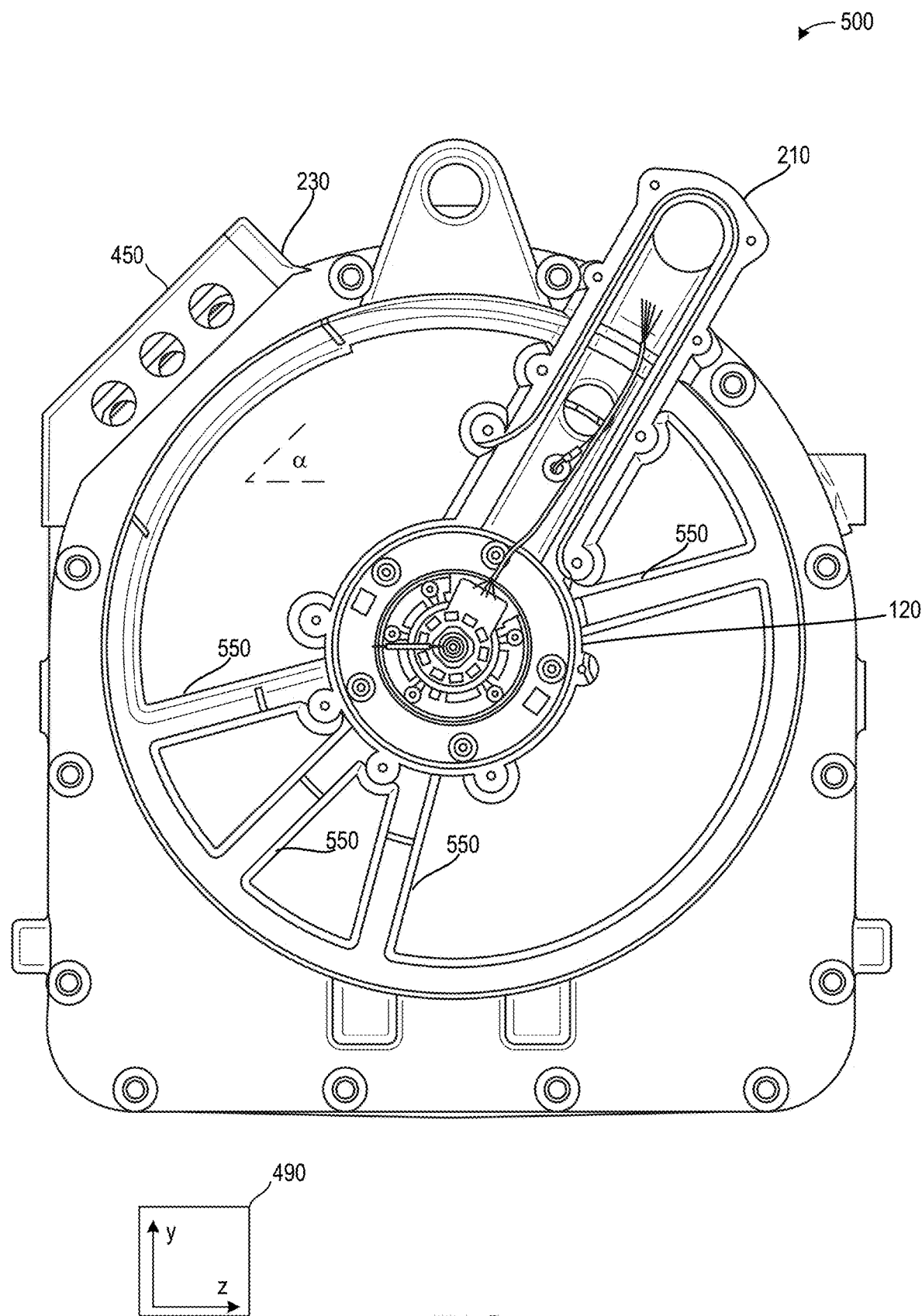
FIG. 5 shows a height of the bolt connection box embodiment.
Figure 6:
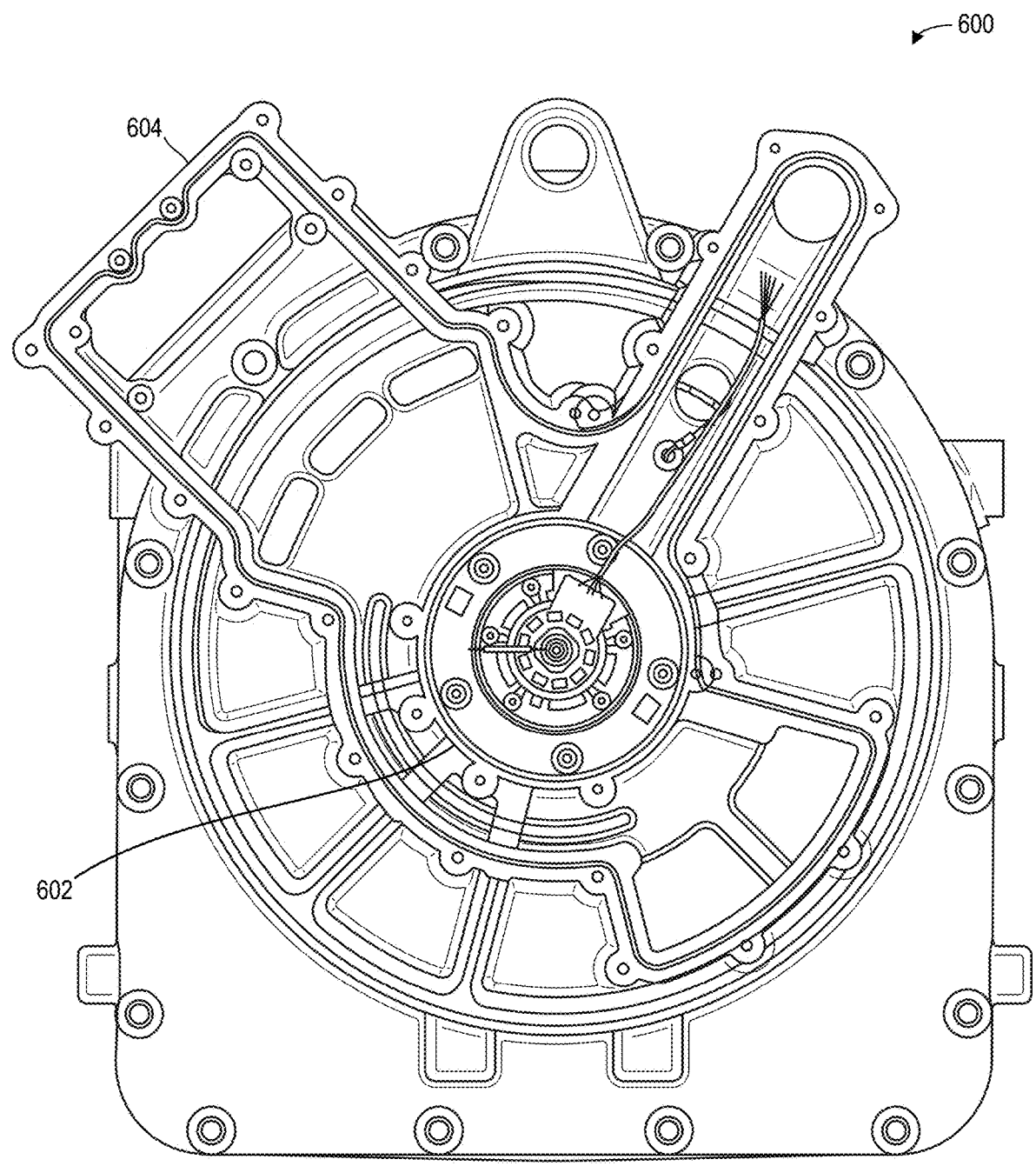
FIG. 6 shows a height of the integrated connection box embodiment.
Figure 6:
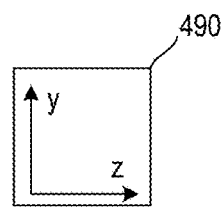
Figure 7:
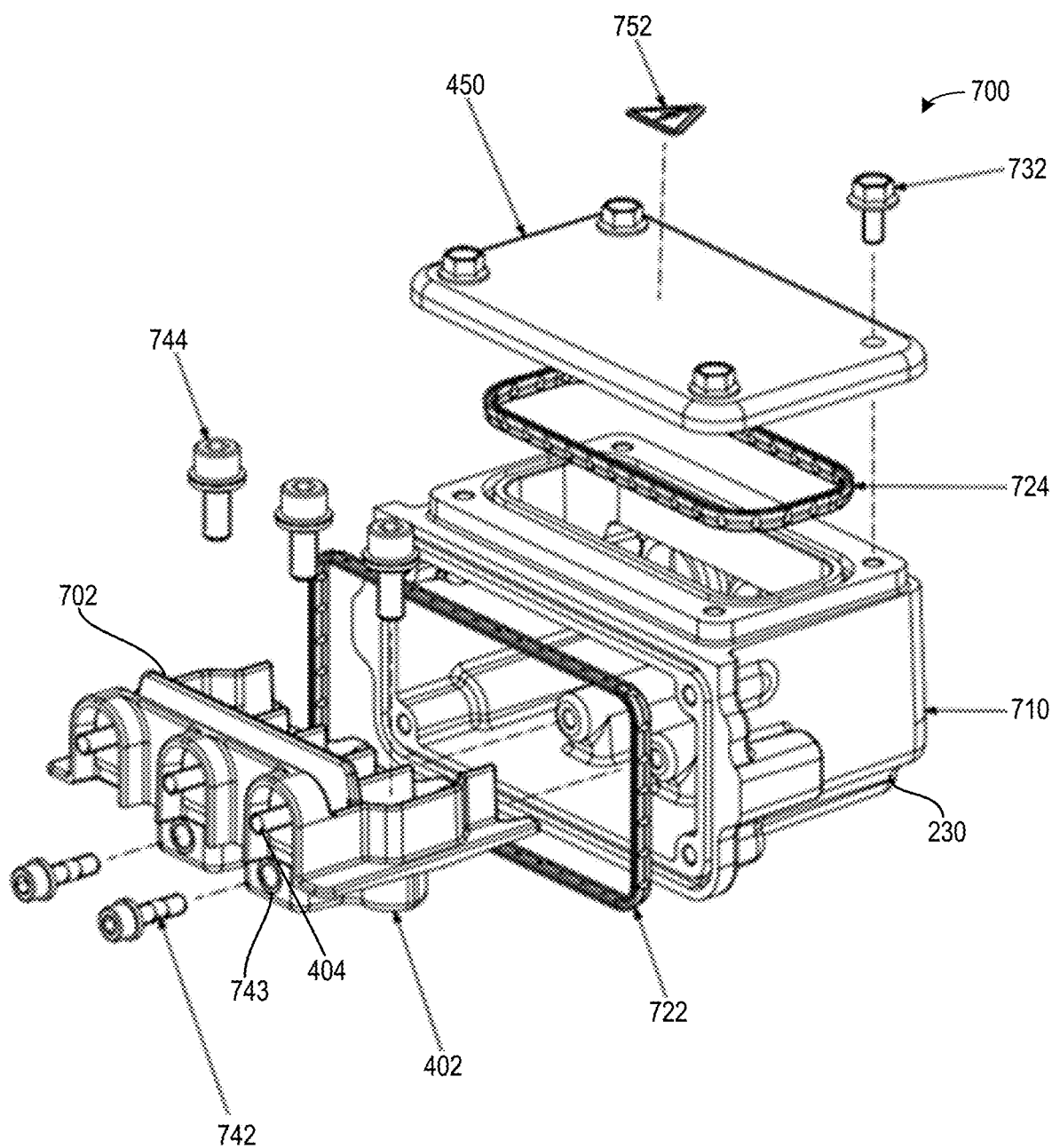
FIG. 7 shows an exploded view of the integrated connection box.

The following description relates to systems for an electric motor cooling jacket. The electric motor cooling jacket may be integrally arranged in the electric motor housing of a hybrid vehicle as shown in FIG. 1. FIGS. 2 and 3 show various views of the electric motor cooling jacket. FIG. 4 shows a cross-sectional view of the electric motor cooling jacket. FIGS. 5 and 6 show various views of the integrated connection box. FIG. 7 shows an exploded view of the integrated connection box.

Turning now to FIG. 1, it shows a vehicle 100 comprising a first shaft 102 and a second shaft 112. The first shaft 102 may be configured to drive a first set of wheels 104 and the second shaft 112 may be configured to drive a second set of wheels 114. In one example, the first shaft 102 is arranged near a front of the vehicle 100 and the second shaft 112 is arranged near a rear of the vehicle 100.

An engine 110 may be coupled to a first gear box 111 and an electric motor 120 may be coupled to a second gear box 121. Each of the first gear box 111 and the second gear box 121 may transfer power to a first differential 103 arranged on the first shaft 102 and a second differential 113 arranged on the second shaft 112. In one example, the engine 110 and the electric motor 120 are arranged in a power-series hybrid configuration. However, it will be appreciated by those of ordinary skill in the art that the hybrid configuration of the vehicle 100 may be in any form without departing from the scope of the present disclosure.

The electric motor 120 is configured to receive energy from a battery 130. The electric motor 120 and the engine 110 are fluidly coupled to a common cooling system 140. In one example, the cooling system 140 flows a liquid, such as oil, coolant, water, or the like, to coolant passages of each of the engine 110 and the electric motor 120.

Herein, the vehicle 100 is at least partially electrically driven. In one example, the vehicle 100 is an all-electric vehicle comprising one or more batteries for powering one or more electric motors to drive the vehicle. In one example, the vehicle 100 is an all-electric passenger truck.

Turning now to FIG. 2, it shows an isometric view 200 of an electric motor cooling jacket with an integrated phase connection box. FIG. 3 shows a view 300 of a bolt on a connection box of the electric motor of the present disclosure. FIG. 4 shows a cross-sectional view 400 taken along the cutting plane illustrated in FIG. 2. FIGS. 5 and 6 illustrate views 500 and 600 depicting height differences between an embodiment of the present disclosure and an embodiment of a previous example, respectively. FIG. 7 illustrates an exploded view 700 of the phase connection box. FIGS. 2-7 may be described in tandem herein.

FIGS. 2, 3, and 7 show an axis system 290 comprising three axes, namely an x-axis parallel to a horizontal direction, a y-axis parallel to a vertical direction, and a z-axis perpendicular to the x- and y-axes. FIGS. 4, 5, and 6 comprise an axis system 490 comprising the y- and z-axes of the axis system 290. FIGS. 2-7 are drawn to scale, although other relative dimensions may be used.

The view 200 illustrates a first side of the electric motor 120 and the view 300 illustrates a second side of the electric motor 120. The electric motor 120 comprises a housing 202 which houses a plurality of electric motor components including a stator, windings, a fan, at least a portion of a shaft, a rotor, and the like. The housing 202 may be physically coupled to the electric motor 120 via a plurality of fasteners 204. In some examples, additionally or alternatively, the housing 202 may be physically coupled via welds, fusions, adhesives, or other similar coupling elements.

The housing 202 may comprise one or more mounting elements such as a first mounting element 210. The housing 202 further comprises a plurality of second mounting elements 212. The mounting elements may fixedly couple the housing 202 to a frame of the vehicle.

The housing 202 is further configured to receive a coolant jacket 220. In one example, the coolant jacket 220 is arranged between first and second portions of the housing 202. As described above, the coolant jacket 220 comprises a connection box 230 integrally arranged therewith. A detailed, cross-sectional view of the coolant jacket 220 and the connection box 230 is illustrated with respect to FIG. 4. In one example, the phase connection box 230 is integrated into a cooling jacket casting/machining, which may eliminate a desire for a separate phase connection box assembly while also integrating the terminal block into the cooling jacket housing. The connection box may be positioned on an angled surface at an angle of a, which in this example is in a range from 40-80 degrees from horizontal. The angled positioned enables an improved packaging configuration due to the height of the box and circular nature of the motor configuration. The positioning of the connection box is also advantageous with respect to being opposite, across the vertical axis y from the mounting element 210, which projects beyond the housing outer perimeter with its reinforced extension. Specifically, mounting element 210 has a raised profile extending down to the center of the motor housing axis, where the housing is further reinforced with asymmetric raised profiles 550. The particular positioning indicated in FIG. 5 of these raised areas with respect the connection box and mounting element enables an overall reduced packaging space for the housing while retaining sufficient cooling and structural rigidity.

The connection box 230 comprises a bus bar assembly 402. The bus bar assembly 402 comprises a motor lead connection 404 at a first end of the bus bar assembly 402. The bus bar assembly 402 further comprises one or more lugs 406 at a second end, opposite the first end, of the bus bar assembly 402. The one or more lugs 406 may radially protrude from the bus bar assembly 402 and into a corresponding recess 432 of the connection box 230.

As shown in FIG. 3, cooling inlet and outlet (272, 274) may be positioned on a side of the housing. The inlet/outlet are positioned on the same side as the connection box 230 to again take advantage of the packaging space needed for the box. FIG. 3 also illustrates various reinforcing ribs 276 at the bottom, with respect to the vertical axis, of the housing.

As illustrated in FIG. 2, an electrical box cover 201 obscures the cooling inlet 272 while the cooling outlet 274 is still exposed. In the example of FIG. 3, the electrical box cover is omitted, thereby exposing the cooling inlet.

The motor lead connection 404 may comprise an electrical connection between a receiver of the motor and a phase connection cable. In one example, there may a plurality of motor lead connections arranged in the bus bar assembly 402, wherein each motor lead connection corresponds to a different phase of the motor. In one example, the motor is a three phase motor and there are three motor lead connections.

The bus bar assembly 402 may further comprise a plurality of seals 410. A first seal 412 may be arranged adjacent to the motor lead connection 404. A second seal 414 may be arranged between the first seal and the one or more lugs 406. In one example, a diameter of the first seal 412 may be smaller than a diameter of the second seal 414. As such, the first seal 412 may seal an inner diameter of the bus bar assembly 402 and the second seal 414 may seal an outer diameter of the bus bar assembly. Each of the first seal 412 and the second seal 414 may be configured to block a cooling liquid from contacting the motor lead connection 404.

The coolant jacket 220 with the integrated phase connection box 230 arranged therein further comprises a threaded connection 420. The threaded connection 420 is a threaded lug connection, in one example. The threaded connection 420 may be a coupling between the connection box 230 and the coolant jacket 220.

The coolant jacket 220 comprises a coolant channel 430 arranged adjacent to a stator 442 and windings 444. The coolant channel 430 may comprise a curved shape wherein coolant flow through the coolant channel 430 flows in a C-shape. Said another way, coolant flows in a first direction in the coolant channel 430, turns to flow in a second direction in the coolant channel 430 toward the bus bar 402, and turns in a third direction away normal to the second direction and opposite to the first direction. The plurality of seals 410 may block the coolant from directly contacting the bus bar 402 and/or the motor lead connection 404.

An access panel 450 may be fastened to an outermost portion of the coolant jacket 220. The access panel 450 may be fastened via a plurality of fasteners 452, which may be accessible to a user when the electric motor 120 is fully assembled.

FIGS. 5 and 6 illustrate a comparison between a present example 500 of the electric motor 120 and a previous example 600 of an electric motor 602. The present example 500 includes the coolant jacket 220 and connection box 230. As a result, a radial protrusion of the connection box 230 in the present example is less than a radial protrusion of the connection box in the previous example 600. In one example, the connection box 604 of the previous example 600 extends a radial distance twice as great as the connection box 230. As such, a packaging size of the previous example is larger than a packaging size of the electric motor 120. In one example, additionally or alternatively, the connection box 230 extends radially outward by a distance equal to 20% or less of a radial distance of the connection box 604.

In one example, a radial distance of the present disclosure measured from a center of the electric motor to an outermost portion of the connection box 230 (e.g., to the access panel 450) may be less than 300 mm. Additionally or alternatively, the radial distance may be less than 285 mm. In one example, the radial distance is equal to 272.5 mm. A radial distance of the previous example measured from a center of the electric motor to an outermost portion of the connection box 604 may be greater than 300 mm. In one example, the radial distance of the connection box 604 from the center of the electric motor is 323.75 mm As illustrated, the housing for the cooling jackets in each of the present example 500 and the previous example 600 is relatively compact. Integration of the connection box therein is relatively difficult due to these packaging constraints and coolant being arranged therein. Thus, the embodiment of FIG. 5 provides an enhanced motor housing and coolant jacket with the connection box integrally arranged therein, which reduces a packaging constraint of the electric motor of a hybrid vehicle. Furthermore, cooling of the connection box and the electrical connections therein may be enhanced, which may increase longevity and electrical conductivity.

In one example, the positioning of the connection box may be such that while it still may be thermally regulated via coolant in the coolant passages of the electric motor, the connection box is radially outside of the cooling passages such that a redesign of the coolant passages is not demanded. As such, pre-existing configurations of the cooling passages may be maintained as the connection box is integrally arranged into the electric motor coolant jacket.

A coolant jacket casting may be larger relative to the previous example in order to support the connection box. Furthermore, an additional casting core may be utilized to reduce machining for a connection box cavity (e.g., recess 432 of FIG. 4) while also reducing thicker sections during the casting process.

Turning to FIG. 7, it shows an exploded view 700 of the connection box 230 outside of the coolant jacket (e.g., coolant jacket 220 of FIG. 2). The connection box 230 comprises a block housing 710, such as a terminal block housing, which may interface with each of the bus bar assembly 402 and the access panel 450.

The bus bar assembly 402 comprises a three-phase AC cable mounting 702 for connecting a motor to an inverter. The three-phase AC cable mounting 702 may be a lug and gland configuration as shown, or may be a quick connect configuration, as shown in FIG. 3. The lug and gland configuration may comprise a first plurality of lugs 742 and a second plurality of lugs 744. The first plurality of lugs 742 extend in a direction parallel to the z-axis and the second plurality of lugs 744 extend in a direction parallel to the y-axis. In one example, the first plurality of lugs 742 extend through first glands 743 adjacent to the motor leads 404. The second plurality of lugs 744 may extend through second glands, wherein the second glands are arranged closer to the access panel 450 than the first glands. The motor leads 404 from a stator assembly (e.g., stator 442 of FIG. 4) may physically couple to the bus bar assembly 402 while allowing three-phase operation of the motor. In one example, the motor leads 404 physically couple to the bus bar assembly 402 in a direction parallel to the x-axis while the three-phase AC cable mounting 702 couples to the inverter in a direction parallel to the y-axis and normal to the motor leads 404.

A first gasket 722 may be arranged between the bus bar assembly 402 and the block housing 710. The first gasket 722 may comprise an elastomeric material configured to block coolant flow between the interface between the bus bar assembly 402 and the block housing 710.

The access panel 450 may be physically coupled to the block housing 710. In one example, the bus bar assembly 402 physically couples to a side face of the terminal block housing 710 and the access panel 450 physically couples to a top face of the block housing 710. The side face may be parallel to a plane normal to a plane to which the top face is parallel.

A plurality of fasteners 732 may physically couple the access panel 450 to the block housing 710. A second gasket 724 may be arranged between the access panel 450 and the block housing 710. A material and a shape of the second gasket 724 may be identical to the first gasket 722.

In the example of FIG. 7, the access panel 450 comprises a label 752 arranged on an outer face. In one example, the label 752 may protrude from the outer face. In this way, the label 752 is not flush with the outer face. The label 752 may comprise a symbol, such as a lightning bolt, such that an operator may be notified the presence of an electrical connection in the block housing 710.

In this way, a phase connection box and bus bar may be integrally arranged in a coolant jacket of an electric motor housing. One or more seals may be arranged around a bus bar to block coolant from leaking into electrical connections and portions of the phase connection box. The technical effect of integrating the phase connection box into the coolant jacket is to enhance temperature control of the electrical connections while also decreasing a packaging size of the electric motor housing.

FIGS. 1-7 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electric motor, comprising:
a phase connection enclosure comprising a bus bar assembly sealed between a motor lead and a plurality of phase cable connections, wherein the bus bar assembly is in direct contact with a coolant channel of a coolant jacket housing of the electric motor, wherein the coolant jacket housing is arranged within an electric motor housing and the coolant channel is in direct contact with a stator of the electric motor, and wherein the phase connection enclosure is integrally arranged in the coolant jacket housing.

2. The electric motor of claim 1, wherein the bus bar assembly comprises a plurality of lugs.

3. The electric motor of claim 1, wherein a threaded lug connection is positioned within the phase connection enclosure.

4. The electric motor of claim 1, wherein the phase connection enclosure comprises a cubical or rectangular prism shape.

5. The electric motor of claim 1, wherein the phase connection enclosure is positioned on an angled surface.

6. The electric motor of claim 5, wherein the phase connection enclosure is arranged between a mounting element and a cooling outlet on a perimeter of the coolant jacket housing.

7. The electric motor of claim 5, wherein a radially extending mounting element is opposite the phase connection enclosure relative to a vertical axis.

8. An electric motor cooling jacket, comprising:
a coolant channel configured to flow coolant in a portion of a coolant jacket housing between a stator and a phase connection box, the coolant jacket housing is arranged within an electric motor housing and the coolant channel is in direct contact with the stator of the electric motor, wherein the phase connection box is integrally arranged in the coolant jacket housing and comprises a bus bar assembly sealed between a motor lead and a plurality of phase cable connections, the bus bar assembly in direct contact with the coolant channel, and wherein the bus bar assembly and a plurality of lug connections are arranged within the coolant jacket housing.

9. The electric motor cooling jacket of claim 8, wherein a bus bar assembly and a plurality of lug connections are arranged within the coolant jacket housing.

10. The electric motor cooling jacket of claim 9, wherein a seal is arranged between the bus bar assembly, a motor lead, and the phase connection box.

11. The electric motor cooling jacket of claim 8, wherein the phase connection box is integrated into a coolant jacket casting.

12. The electric motor cooling jacket of claim 8, wherein the phase connection box is sealed externally with an access panel.

13. The electric motor cooling jacket of claim 12, wherein a gasket is arranged between the phase connection box and the access panel.

14. The electric motor cooling jacket of claim 8, wherein motor leads extend from a stator bolt to a bus bar assembly to provide three-phase control of a motor.

15. The electric motor cooling jacket of claim 8, wherein a bus bar assembly of the phase connection box is configured to electrically couple an inverter to a motor via a lug and gland coupling.

16. A system, comprising:
a phase connection box integrally formed in a machining of a cooling jacket housing arranged within a housing of an electric motor, wherein a first sealing ring is arranged between a bus bar assembly and a plurality of motor leads, wherein the bus bar assembly is arranged within the phase connection box, and wherein a second sealing ring is arranged between the phase connection box and an access panel, and wherein the bus bar assembly is in direct contact with a coolant channel of the coolant jacket housing, and the coolant channel is in direct contact with a stator of the electric motor.

17. The system of claim 16, wherein the first sealing ring and the second sealing ring block coolant from a coolant channel of the cooling jacket from contacting the plurality of motor leads.

18. The system of claim 16, wherein the plurality of motor leads extend from a stator bolt to the bus bar assembly to allow three-phase control of a motor.

19. The system of claim 16, wherein the phase connection box is physically coupled to the cooling jacket via a threaded connection.

20. The system of claim 16, wherein the coolant channel comprises a C-shape.

* * * * *

UNITED STATES PATENT AND TRADEMARK OFFICE
CERTIFICATE OF CORRECTION

| | |
|---|---|
| PATENT NO. | : 11,677,292 B2 |
| APPLICATION NO. | : 17/029677 |
| DATED | : June 13, 2023 |
| INVENTOR(S) | : Darren J. Ziskovsky |

It is certified that error appears in the above-identified patent and that said Letters Patent is hereby corrected as shown below:

On the Title Page

Column 1, item (73) correct "Dana Automotive Systems Group, LLC" to read "Dana Heavy Vehicle Systems Group, LLC"

Signed and Sealed this
Sixteenth Day of January, 2024

Katherine Kelly Vidal
*Director of the United States Patent and Trademark Office*